United States Patent [19]
Gunderson

[11] 3,963,088
[45] June 15, 1976

[54] TRACTION CONTROL DEVICE

[76] Inventor: Ralph R. Gunderson, 8212 S. Homan, Chicago, Ill. 60652

[22] Filed: Aug. 7, 1975

[21] Appl. No.: 602,759

[52] U.S. Cl. .............................................. 180/74
[51] Int. Cl.² ........................................ B60K 23/04
[58] Field of Search ............ 180/70 R, 74, 75, 19 R, 180/77 R; 188/106 R, 106 P

[56] References Cited
UNITED STATES PATENTS

| | | | |
|---|---|---|---|
| 1,659,087 | 2/1928 | Dodge | 188/106 R |
| 1,882,467 | 10/1932 | Wilt | 180/75 |
| 2,771,959 | 11/1956 | Phelps | 180/74 |
| 2,944,616 | 7/1960 | Bernard et al. | 180/19 R |
| 3,194,337 | 7/1965 | Parks | 180/74 |
| 3,339,662 | 9/1967 | Hanson et al. | 180/77 R |
| 3,454,125 | 7/1969 | Wagner | 180/74 |
| 3,907,058 | 9/1975 | Gunderson | 180/74 |

Primary Examiner—M. H. Wood, Jr.
Assistant Examiner—J. D. Rubenstein
Attorney, Agent, or Firm—Wegner, Stellman, McCord, Wiles & Wood

[57] ABSTRACT

A vehicle, such as a tractor, having propelling wheels connected by a differential, together with a traction control device for connecting the propelling wheels directly when the differential permits relative motion between the propelling wheels, comprising a torque transfer assembly including a rotatable shaft, friction elements fixed on the shaft spaced apart axially to engage the propelling wheels, and bearing means for supporting the shaft, resiliently flexible support means secured on the vehicle chassis and connected remotely to the torque transfer assembly to permit movement of the assembly between an inoperative position and an operative position and an actuating means adjacent the operator's station and secured to the support means to move the assembly to an operative position. Preferably the resilient support means urges the torque transfer assembly toward an inoperative position.

5 Claims, 3 Drawing Figures

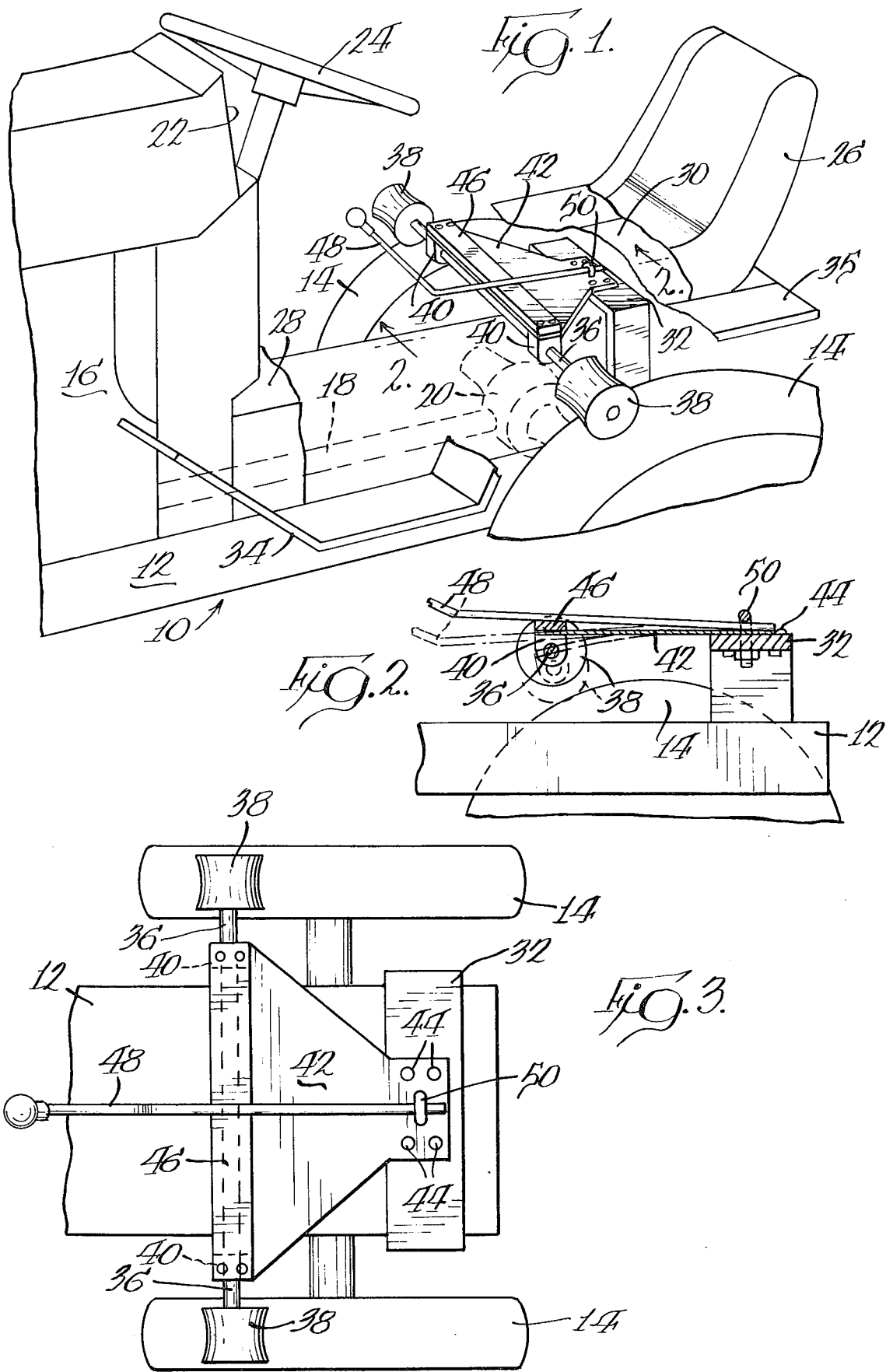

TRACTION CONTROL DEVICE

BACKGROUND OF THE INVENTION

The present invention relates generally to a new and improved traction control device for use in connection with a vehicle having propelling wheels driven through a differential which prevents relative motion between the propelling wheels and includes means for connecting the propelling wheels directly by means of a rotatable shaft having friction rollers movable into and out of contact with the propelling wheels. More particularly, the present invention relates to the mounting of the rotatable shaft on a resilient flexible support.

In the prior art, U.S. Pat. No. 1,882,467 relates to a traction device utilizing a shaft for positively connecting propelling wheels by means of intermeshing gearing on the shaft and on the rotating drum fixed to each of the propelling wheels.

U.S. Pat. No. 2,771,959 shows a vehicle in which supporting wheels are driven by sharp-toothed drive gears mounted on a rotatable shaft which, in turn, is driven by a series of pulleys.

U.S. Pat. No. 3,194,337 discloses a shaft having rollers mounted on each end for engagement with the drive wheels of the vehicle. The shaft is mounted to the vehicle by two sets of linkages, each set having a swingable link and an adjustable link which is manually operated similar to a turnbuckle to bring the rollers into engagement with the wheels.

My prior applications Ser. No. 337,917 filed Mar. 5, 1973, now Pat. No. 3,907,058 and Ser. No. 360,300 filed May 4, 1973, both relate to traction control devices. The former application discloses a device in which the bearing means for the shaft are movably mounted on the vehicle chassis. The latter application relates to a device in which the shaft is mounted for tiltability to accommodate propelling wheels of differing diameters.

It would be desirable to provide a means for mounting a traction control device which is simpler than those devices shown in the prior art, which is capable of mounting on an existing vehicle, and which is easier to operate.

SUMMARY OF THE INVENTION

It is the principal object of the present invention to provide an improved and simplified traction control device. More specifically, it is an object of the present invention to provide a traction control device which is particularly suited for use in situations where the device is to be manually controlled, where the device is normally inoperative, or where the device is utilized to couple wheels of differing diameters.

The traction control device includes a torque transfer assembly having a rotatable shaft, a pair of friction rollers, and a pair of bearings supporting said shaft. In accordance with the present invention, the torque transfer assembly is mounted on a resiliently flexible support which is rigidly fixed at a remote end to the chassis of the vehicle. The resiliency of the support preferably causes the torque transfer assembly to normally be urged toward a retracted position. The flexibility of the support enables the support to be flexed so that the torque transfer assembly is in an operative position and also enables the support to be flexed in differing planes so that the assembly will accommodate wheels of differing diameters.

In an exemplary embodiment of the present invention, a handle, the front portion of which is accessible from the operator's station, is provided for actuation of the traction control device. The handle has a rear portion which is loosely secured to the chassis, and an intermediate portion which spans the support and is secured to a forward portion of the support so that when the operator depresses the handle, the support is also depressed to move the torque transfer assembly into operative engagement with the propelling wheels.

In a preferred embodiment, a rigid bridge plate is provided and spans the space between the shaft support bearings. The bridge plate maintains the bearings in alignment so that flexing of the support does not cause the shaft to bind within the bearings.

Further features and advantages of the invention will readily be apparent from the following specification taken in conjunction with the accompanying drawings.

BRIEF DESCRIPTION OF THE DRAWINGS

FIG. 1 is a fragmentary perspective view of a vehicle such as a garden tractor with a traction control device embodying the principles of the present invention;

FIG. 2 is a fragmentary sectional view taken about the line 2—2 of FIG. 1; and

FIG. 3 is a fragmentary plan view of the vehicle illustrated in FIG. 1.

DESCRIPTION OF THE PREFERRED EMBODIMENTS

Referring to FIGS. 1–3, a traction control of the present invention is illustrated in connection with a garden tractor 10 having a chassis 12 supported on wheels including a pair of rear, rubber-tired propelling wheels 14 and a pair of front sterring wheels (not shown). In the tractor illustrated, there is a prime mover in the form of a gasoline engine 16 on the front of the chassis 12 connected to drive an appropriate transmission system including a drive shaft 18 in turn arranged for rotating the propelling wheels 14 through a final differential 20. The vehicle is adapted to be controlled from an operator's station generally defined by a control panel 22, a steering wheel 24 for controlling the front steering wheels, and a seat 26 on which an operator may be seated in a position accessible to the steering wheel 24 and the control panel 22 for appropriately controlling the engine 16 and the transmission system driven thereby.

The vehicle preferably also includes a floor and fender panel 28 having a front end appropriately secured to the chassis 12, and a rear end portion 30 disposed beneath the seat 26 and supported by a transverse beam 32 on the chassis 12 between the propelling wheels 14. The floor and fender panel 28 includes foot rests 34 at opposite sides of the chassis 12 and associated fenders 35 at opposite sides of the seat 26 overlying the propelling wheels 14.

According to the present invention, a traction control device is provided for directly connecting the propelling wheels 14 so that relative motion between the propelling wheels 14 is prevented and the action of the differential 20 is bypassed. The traction control device includes a transverse shaft 36 spanning the propelling wheels 14 and having friction elements or rollers 38 fixed at opposite ends thereof and spaced apart axially at positions which enable movement of the friction elements 38 into and out of contact with the peripheral surface of the rubber-tired propelling wheels 14. The shaft 36 is rotatably supported in spaced bearings 40 in turn mounted on the underside of a support 42. The friction elements 38 may be molded of hard rubber or yieldable plastic material of a type which would provide adequate traction for transferring torque from one of the propelling wheels 14 to the other. Preferably, the friction elements 38 have roughened or studded surfaces to additionally aid traction between the friction elements 38 and the propelling wheels 14. The friction elements 38 may be integral with the shaft 36 or separate and keyed on the shaft 36. The bearings 40 may comprise molded blocks of suitable plastic bearing material appropriately secured to the support 42. The shaft 36, the friction elements 38, and the bearing 40 comprise the torque transfer assembly.

The support 42 is generally triangular in shape and is firmly cantilevered by bolts 44 at one vertex to the transverse beam 32 in turn mounted on the chassis 12. The other two vertices of the support 42 remote from the beam 32 are firmly fixed between the bearings 40 and a rigid bridge plate 44 so as to provide a mounting for the torque transfer assembly. The bridge plate 44 spans the space between the bearings 40 and maintains alignment of the bearings 40 to prevent binding of the shaft 36 therewithin.

In order to provide for movement of the torque transfer assembly to an operative position with the friction elements 38 in contact with the propelling wheels 14, the support 42 is constructed from a resiliently flexible material. The resiliency of the material causes the friction elements 38 to be normally urged to an inoperative position out of contact with the propelling wheels 14. The flexibility of the material enables the support 42 to bend so that the friction elements frictionally engage the propelling wheels 14 even though the support 42 is immovably fixed at one end to the transverse beam 32. The flexibility of the material also permits twisting or tilting movement of the support 42 so that the friction elements 38 tractively engage the propelling wheels 14 even if the wheels are of different size or diameter. Thus, the friction elements 38 are movable through different arcs if necessary. Regardless of the bending or twisting of the support 42, the shaft 36 remains aligned within the bearings 40 due to the rigidity of the bridge plate 46.

To enable the operator to engage the traction control device, a handle 48 is loosely secured at a rearward portion to the transverse beam 32 by a U-bolt 50 passing thereabout, is fixed at an intermediate portion to the bridge plate 46, as by welding, and projects forwardly through an aperture in the floor panel 28 so that the forward portion thereof is accessible to an operator residing on the seat 26.

In operation, the resiliency of the support 42 preferably normally urges the torque transfer assembly upwardly toward an inoperative retracted position so as to maintain the friction elements 38 out of contact with the propelling wheels 14. With the friction elements 38 retracted to the position illustrated by the solid lines of FIG. 2, the propelling wheels 14 are permitted to rotate at differing velocities. In the event that the vehicle moves into an area, such as ice, snow, mud, or the like, in which one of the propelling wheels 14 is rotating faster than the other and positive traction of both propelling wheels 14 is required, the operator pushes the handle 48 downwardly so that the torque transfer assembly is in an operative position. With the friction rollers 38 in contact with the propelling wheels 14, as illustrated by the dashed lines of FIG. 2, the propelling wheels 14 are locked together, thereby bypassing the differential 20 and causing the propelling wheels 14 to rotate in unison. Thus, if one of the wheels 14 is spinning without propelling the vehicle, the propelling motion of the spinning wheel is transmitted to the opposite wheel on a tractive surface to put the vehicle in motion. In a braking situation, if one of the propelling wheels 14 is locked and the other wheel is rolling, the device may be utilized to lock the rolling wheel on a tractive surface and thereby brake the vehicle. When traction control is no longer required, i.e., the slippery terrain is traversed, the operator merely releases the handle 48 and the torque transfer assembly returns to an inoperative retracted position because of the inherent resiliency of the support 42. Differential rotation of the propelling wheels 14 is once again permitted. Note that the device is bidirectional, i.e., it is operative while the vehicle is moving either forward or backward.

Furthermore, the traction control device may be immediately actuated by the operator while the vehicle is still in motion so that when difficult terrain is encountered, the momentum of the vehicle itself can be utilized to additionally aid the traction caused by the engagement of the torque transfer device. Similarly, the device can be immediately deactivated when the difficult terrain is transversed while the vehicle is still moving.

I claim:

1. In a vehicle having a chassis with propelling wheels connected by a differential, a torque transfer device operable from an operator's station on the vehicle for connecting the propelling wheels directly to transfer torque from one wheel to the other when the differential permits relative rotation between the wheels, comprising: a torque transfer assembly including a rotatable shaft, friction elements fixed on the shaft and spaced apart axially to engage the propelling wheels of the vehicle, and bearing means positioned between the friction elements for rotatably supporting the shaft; support means of resiliently flexible material secured at one end to the chassis and connected remotely from said one end to said bearing means, flexure of the resilient support means permitting movement of the friction elements of the assembly between an inoperative position spaced from the propelling wheels and an operative position in frictional engagement with the propelling wheels; and an actuating means positioned adjacent the operator's station and secured to the support means so as to afford movement of said friction elements between said inoperative and operative positions.

2. A torque transfer device as specified in claim 1, in which the support means normally maintains the friction elements in inoperative position spaced from the propelling wheels.

3. A torque transfer device as specified in claim 1, in which the actuating means is secured to the support means in a position to transfer force to the bearing means.

4. A torque transfer device as specified in claim 1, in which the bearing means includes a pair of spaced bearings between the friction elements, and a rigid bridge member is secured to the support means and extends between the spaced bearings, said bridge member receiving forces from the actuating means and distributing said forces to the spaced bearings.

5. A torque transfer device as specified in claim 4, in which the support means normally maintains the friction elements in inoperative position spaced from the propelling wheels.

\* \* \* \* \*